United States Patent
Van Sprang

[11] Patent Number: 5,490,003
[45] Date of Patent: Feb. 6, 1996

[54] REFLECTIVE LIQUID CRYSTAL DISPLAY DEVICE WITH TWIST ANGLE BETWEEN 50° AND 68° AND THE POLARIZER AT THE BISECTRIX

[75] Inventor: Hendrik A. Van Sprang, Eindhoven, Netherlands

[73] Assignee: U.S. Philips Corporation, New York, N.Y.

[21] Appl. No.: 141,433

[22] Filed: Oct. 21, 1993

Related U.S. Application Data

[63] Continuation of Ser. No. 898,988, Jun. 15, 1992, abandoned.

[30] Foreign Application Priority Data

Jun. 28, 1991 [EP] European Pat. Off. .............. 91201665

[51] Int. Cl.⁶ .......................................................... G02F 1/13
[52] U.S. Cl. .............................. 359/63; 359/102; 359/7 0
[58] Field of Search .................................. 359/41, 63, 64, 359/78, 93, 72, 102, 70, 65

[56] References Cited

U.S. PATENT DOCUMENTS

| | | | |
|---|---|---|---|
| 4,019,807 | 4/1977 | Boswell et al. ............................ | 359/93 |
| 4,378,955 | 4/1983 | Blehu, Jr. et al. ......................... | 359/93 |
| 4,896,947 | 1/1990 | Leenhouts ................................. | 359/102 |
| 4,999,619 | 3/1991 | Te Velde .................................... | 359/63 |
| 5,105,289 | 4/1992 | Sonehara et al. .......................... | 359/93 |
| 5,139,340 | 8/1992 | Okumura .................................... | 359/63 |
| 5,249,071 | 9/1993 | Yoshimizo et al. ........................ | 359/63 |

FOREIGN PATENT DOCUMENTS

| | | |
|---|---|---|
| 0377757 | 7/1990 | European Pat. Off. . |
| 2154616 | 8/1985 | United Kingdom . |

OTHER PUBLICATIONS

Sonehara et al., "A New Twisted Nematic Electrically Controlled Bisefringent (TN–ECB) Made for a Reflective Light Valve", Proceedings of the SID, vol. 31/2, 1990.

*Primary Examiner*—William L. Sikes
*Assistant Examiner*—Kenneth Parker
*Attorney, Agent, or Firm*—Norman N. Spain

[57] ABSTRACT

To obtain a monotonic transmission/voltage characteristic curve in a reflective display having a small twist angle, the polarizer in a cell with crossed polarizer and analyzer is arranged parallel to the dividing line of the directions of orientation (23, 24) determining the twist angle α, the cell being optimized for α and d.Δn.

7 Claims, 3 Drawing Sheets

REFLECTIVE LIQUID CRYSTAL DISPLAY DEVICE WITH TWIST ANGLE BETWEEN 50° AND 68° AND THE POLARIZER AT THE BISECTRIX

This is a continuation of application Ser. No. 07/898,988, filed Jun. 15, 1992, now abandoned.

BACKGROUND OF THE INVENTION

The invention relates to a display device for use in reflection, provided with a layer of liquid crystalline material between a first transparent supporting plate having at least one transparent first drive electrode and a second supporting plate having at least one controllable picture electrode, said layer of liquid crystalline material being switchable between two states via electric voltages on the picture electrodes, while, dependent on the applied electric voltage, the device traverses a range of continuously decreasing or increasing values of reflection between a first state, in which the molecules of the liquid crystalline material have a first direction of orientation which is substantially parallel to the supporting plates or extend at a small angle to the supporting plates, the direction of orientation, viewed across the thickness of the layer of liquid crystalline material, having a rotation or twist, and a second state, in which the molecules of the liquid crystalline material have a second direction of orientation which is substantially perpendicular to the first direction of orientation, the difference in optical path length difference between the ordinary and extraordinary wave between the two states being substantially ½ $\lambda_0$ after reflection for an incident beam having a central wavelength of $\lambda_0$.

The invention also relates to a projection display device comprising such a display device.

A device of the type described in the opening paragraph is disclosed in EP 0,377,757. In this Application it has been described how an optimum reflection is obtained for two specific twist angles (63° and 193°) for a reflective liquid crystal display device having a polarizer which is parallel to the director of the liquid crystal material at the area of the front face, with associated optimal values for the optical path length difference d.$\Delta$n (d: thickness of the liquid crystal layer, $\Delta$n: difference in refractive index between the ordinary and the extraordinary wave). Notably for the angle of 63° this leads to a low value of d.$\Delta$n so that the display device will have a small thickness (up to approximately 2 μm) in practice. Moreover, the device is optimized for one wavelength when used between parallel polarizers. As a result the light incident on the mirror is not always circularly polarized. In a wavelength range (500–600 nm) to be used for projection display there is thus a variation of the transmission in the dark state (at low voltages) up to about 4%, which considerably reduces the contrast.

Moreover, at high voltages, peripheral effects occur between the director at the rear wall and wave components of the wave to be reflected, thus introducing an additional birefringence.

SUMMARY OF THE INVENTION

It is one of the objects of the invention to provide a display device of the type described in the opening paragraph which substantially does not have any residual transmission in the dark state for a wide wavelength range as is used for projection television, while in the light-transmissive state the quantity of transmitted light is maximal.

It is another object of the invention to provide a display device of said type with a transmission/voltage characteristic whose transmission values outside the transition range in the two extreme states substantially do not vary over a large voltage range. This renders a high contrast possible and grey scale inversions are prevented.

To this end, a display device according to the invention is characterized in that the device comprises a polarizer and an analyzer whose directions of polarization cross each other substantially perpendicularly and the polarizer direction is substantially parallel to the dividing line of the twist angle determined in the first state by the directions of orientation at the area of the supporting plates, said angle having a value of between 50 and 68 degrees and the optical path length d.$\Delta$n having a value of between 0.58 $\lambda_0$ and 0.68 $\lambda_0$.

By using the crossed polarizer and analyzer there is maximum extinction in the range above a given drive voltage, which is substantially independent of the wavelength over a wide wavelength range (450–600 nm). Due to the choice of the polarizer direction along the dividing line of the angle between the directions of orientation (twist angle) it is actually achieved that the interaction between incident linearly polarized light and the molecules in the first layer is compensated by a similar interaction between (elliptically or circularly polarized) light and the molecules at the area of the reflecting wall prior to reflection. The same applies in a reverse sense to the passage of light after reflection.

By also imposing the requirement that the light is circularly polarized at the reflection, optimal values for the twist angle $\alpha$ and for d.$\Delta$n/$\alpha_0$ are found. A reflective display device satisfying these conditions is found to switch from voltage-independent white to substantially complete black via a continuous transition curve and thus has a high contrast.

BRIEF DESCRIPTION OF THE DRAWING

In the drawings:

FIG. 7 shows how the maximum extinction depends on the twist angle, while

DETAILED DESCRIPTION OF THE INVENTION

Figure 1:
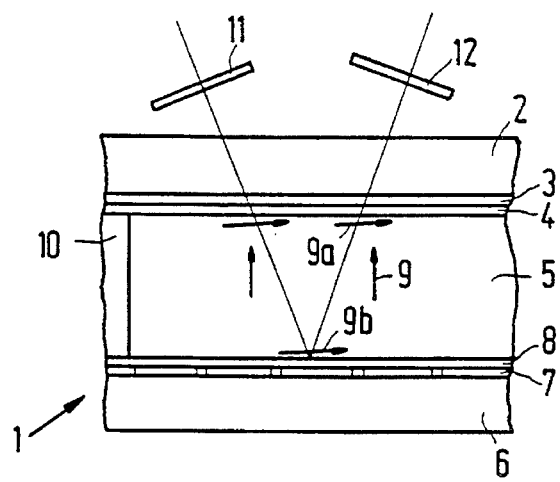
FIG. 1 is a diagrammatic cross-section of a device according to the invention.

The invention will be described in greater detail with reference to the drawing and an embodiment.

FIG. 1 is a diagrammatic cross-section of a pan of a display device 1 having a first supporting plate 2 of, for example, glass. The just supporting plate 2 is provided with a transparent electrode 3 of indium-tin oxide or another suitable material and an orientation layer 4. A liquid crystal material 5, for example, ZLI 84460 is present between the first supporting plate and a second supporting plate 6 which is also made of glass or may consist of a semiconductor body. The supporting plates are spaced apart by means of spacers (not shown) and the assembly is sealed by means of a sealing edge 10.

In this example a matrix of pixels consisting of reflecting picture electrodes 7 of, for example, aluminium which are also coated with an orientation layer 8 are provided on the second supporting plate.

The device of FIG. 1 also comprises a polarizer 11 and an analyzer 12 whose directions of polarization are crossed perpendicularly to each other. According to the invention, the direction of polarization 21 (FIG. 2) of the polarizer II is such that it is located along the bisectrix of the twist angle which is determined by the angle between the two directions of orientation 23 and 24 at the side of the first supporting plate 2 and the second supporting plate 3, respectively. This angle is 60°. The direction of polarization 22 of the analyzer 12 is perpendicular to that of the polarizer 11.

Since the directors 9 of substantially all liquid crystal molecules are directed perpendicularly to the supporting plates at high electric voltages between the electrodes 3, 7, the device is then substantially homeotropic then. Substantially all the polarized light is therefore transmitted without any birefringence and obstructed by the analyzer. The only birefringence which occurs is that at the interfaces between the orientation layers 4, 8 and the adjacent liquid crystal layers because at that area the directors $9a$, $9b$ are not directed completely perpendicularly to the supporting plates.

Figure 2:
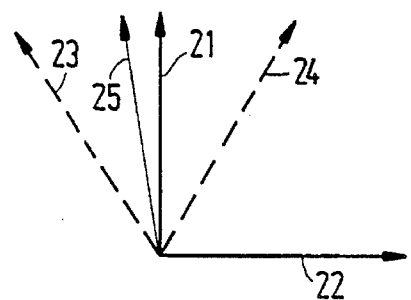
FIG. 2 shows the relationship between the directions of polarization of the analyzer and the polarizer and the directions of orientation.

Due to this interaction linearly polarized light incident at the direction of polarization 21 acquires a slightly elliptical polarization which is diagrammatically shown in FIG. 2 by means of the arrow 25. After passing through the homeotropic part of the liquid crystalline material 5 there is a similar but opposed interaction at the interface between the liquid crystal layer at the area of the substrate 6 and the orientation layer 8. Due to the choice of the direction of polarization 21 along the bisectrix of the twist angle these interactions substantially cancel each other. A similar reasoning applies to the influence exerted on the reflected wave by said interactions.

Figure 3:
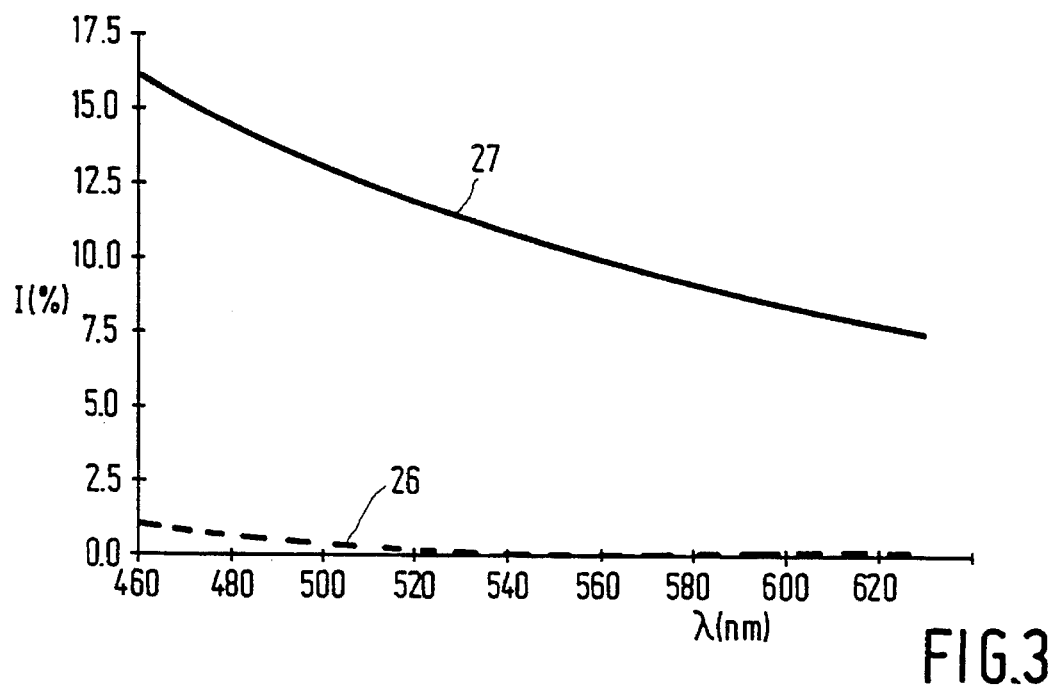
FIG. 3 shows the relationship between the wavelength and the quantity of transmitted light for a device according to the invention and for a state-of-the-an device.

Due to this measure the result is achieved that the residual transmission in the extinguished state is substantially negligible over a wide wavelength range (460–620 nm). This is further illustrated in FIG. 3. Curve 26 shows the residual transmission in the black state (at a drive voltage of 3.5 Volts) for a device according to the invention; the maximum transmission is about 1% of that in the transmissive state so that a high contrast (about 100:1) is possible. A similar curve 27 for a state-of-the-art device shows that the residual transmission is unacceptably high.

Figure 4:
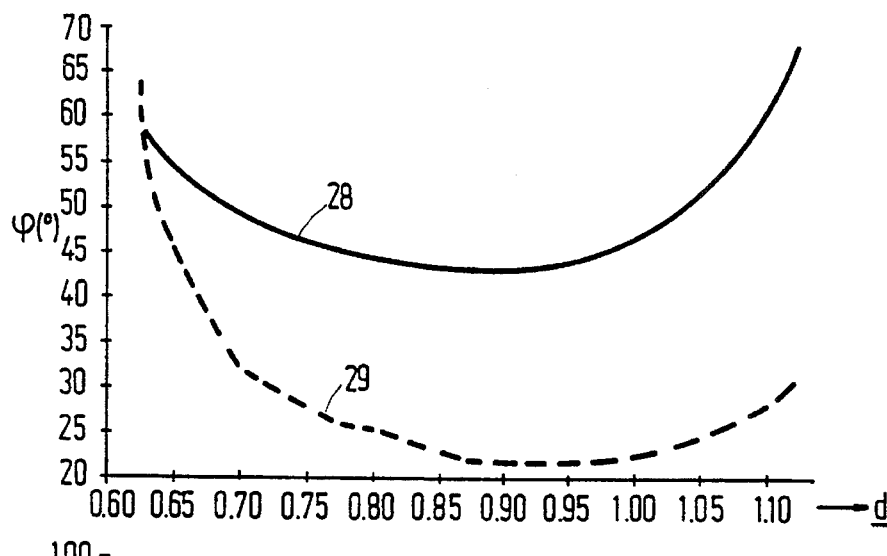
FIG. 4 shows the conditions for maximum reflection and maximum light output.

To obtain maximum transmission in the device of FIGS. 1, 2 in the non-driven state (at a drive voltage which is lower than a certain threshold), the total optical path length after reflection should be ½ $\lambda_0$ and the light at the area of the reflecting electrodes 7 should be reflected to a maximum extent or should be circularly polarized. To this end it has been computed for which values of the twist angle Δ and the birefringence $d.\Delta n$ at the area of the analyzer it holds that $d.\Delta n = \frac{1}{2}\lambda_0$ (curve 28 in FIG. 4) and that maximum reflection occurs at the area of the reflector (curve 29 in FIG. 4). The point of intersection of the two lines then determines the optimum conditions, namely $\alpha=60$ and $d.\Delta n/\lambda_0 = 0.625$.

Figure 5:
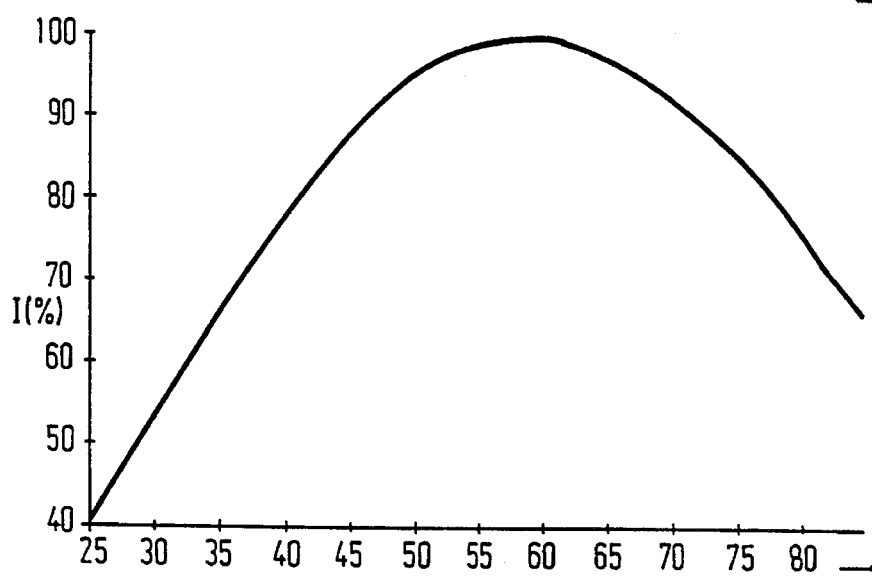
FIG. 5 shows the relationship between the twist angle and the light intensity for the optimal value of d.$\Delta$n at 550 nm.
Figure 6:
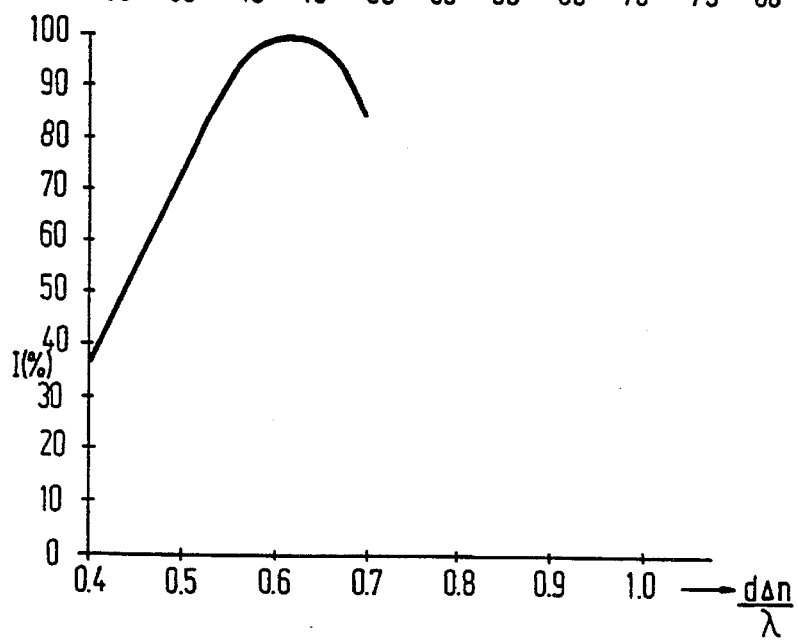
FIG. 6 shows the relationship between d.$\Delta$n/$\lambda_0$ and the transmitted quantity of light at 546 nm.

FIG. 5 shows that for the found value of $d.\Delta n/\lambda = 0.625$ the angle α may vary to some extent so that a high transmission is still obtained at a central wavelength of 550 nm (variations of several percents of the maximum intensity have less influence on the contrast than variations of the residual transmission). With a choice of about 95% of the maximum light intensity, α may vary between 50 and 68 degrees. Similarly, it is apparent from FIG. 6 that $d.\Delta n$ may vary between 0.58 $\lambda_0$ and 0.68 $\lambda_0$.

Figure 7:
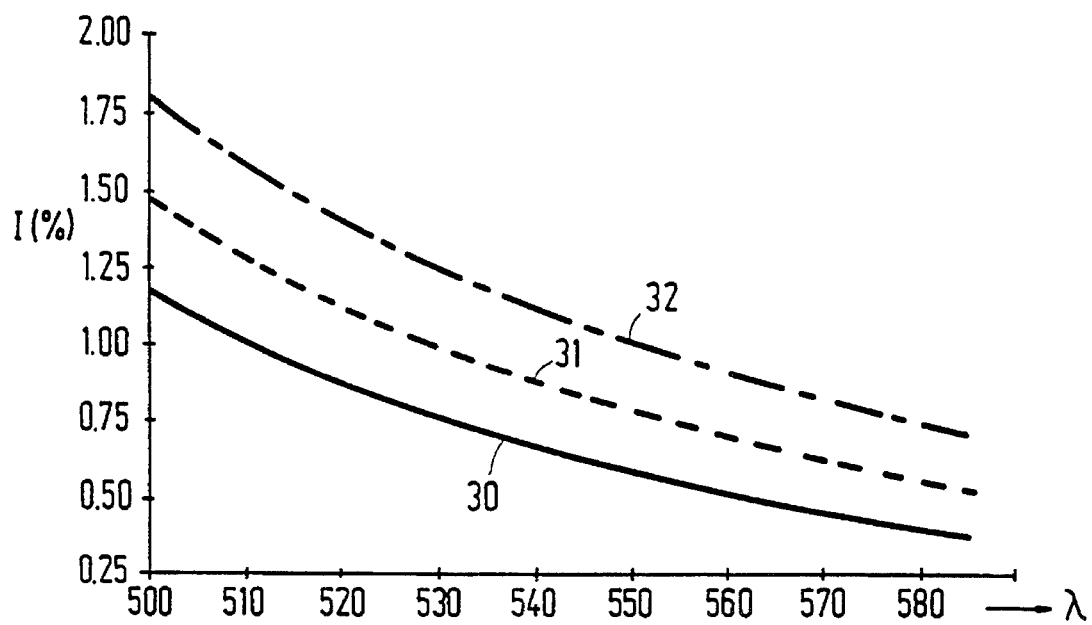

FIG. 7 shows the critical form of the mutual angle between the direction of polarization 21 and the direction of orientation 23 for the devices described. In the wavelength range of 500–580 nm the residual transmission is shown for the device as described above (curve 30) in which said angle is 30° and for otherwise identical devices for which this angle is 30°±30' (curve 31) and 30±1° (curve 32) at a drive voltage of 3.25 Volts.

The picture electrodes 7 can be driven electrically by means of switching elements which are provided either on the substrate 6 (glass) or are provided in the substrate when using a semiconductor substrate (silicon).

Figure 8:
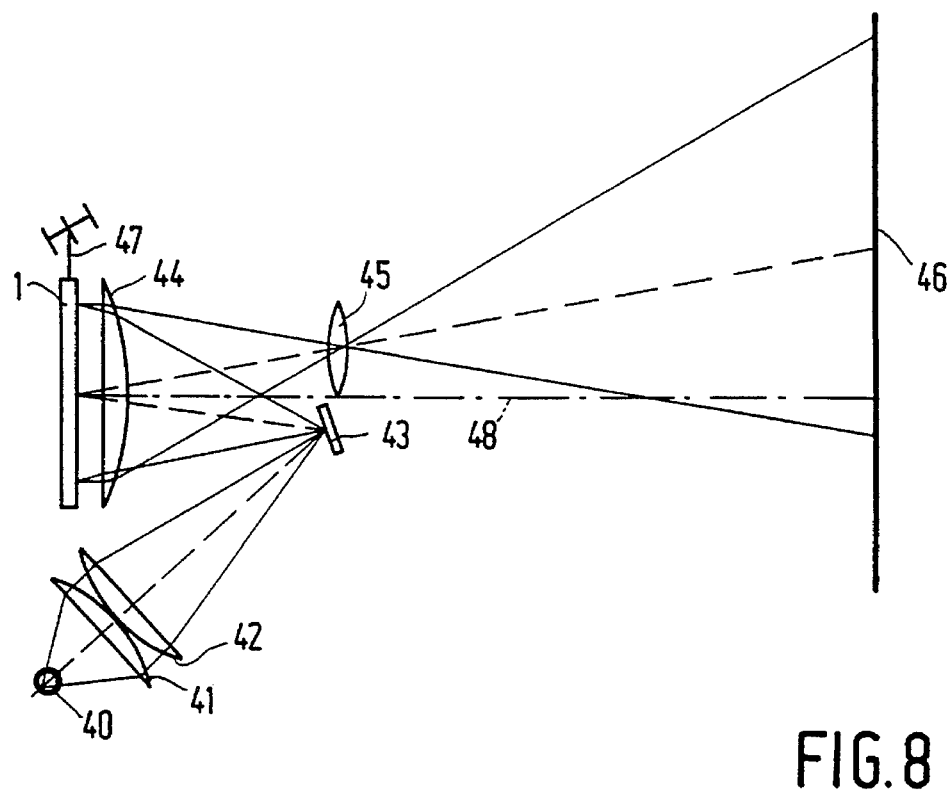
FIG. 8 shows diagrammatically a projection display device comprising a device according to the invention.

FIG. 8 shows diagrammatically a projection device provided with a device 1 as described in FIGS. 1, 2.

A lamp 40 (shown diagrammatically) emits a light beam which, after having passed the collimator lenses 41, 42, is incident on a mirror 43 and is thereby reflected towards the liquid crystal device 1 through a small angle with respect to the normal 48.

The light reaches the reflecting electrodes 7 provided on display device 1 via a planoconvex lens 44, which electrodes determine the state of the device 1 (reflective or non-reflective) under the influence of drive electronics. The information may be, for example, an (adapted) TV signal which is shown diagrammatically by means of the antenna symbol 47.

After it has been reflected, the beam leaves the device 1 at a small angle with respect to the normal 48 and reaches the image plane 46 via the planoconvex lens 44 and a second lens 45. This plane may coincide, for example, with a projection screen. In this case the polarizer and analyzer are arranged, for example, between the mirror 43 and the planoconvex lens 44 and between the lenses 44 and 45, respectively.

For color display, FIG. 8 shows the arrangement for one of the three composite colours, for example, blue, green and red. The source then preferably emits a spectrum having a central wavelength which is adapted to the relevant colour. The device 1 can of course also be used in completely different reflective projection arrangements.

I claim:

1. A projection device comprising a light source, a reflective display device of the twisted nematic type comprising a layer of liquid crystalline material between a first and a second supporting plate, said supporting plates being provided with orientation means which define a twist angle φ for the molecules of the liquid crystalline material, means being provided for directing light from the light source onto the first supporting plate, the second supporting plate being provided with means for reflecting light which passes through the layer of liquid crystalline material, which projection device further comprises polarizing means in the light path between the light source and the first supporting plate and analyzing means in the light path after reflection at the display device characterized in that the twist angle $\phi$ has a value between 50 and 68 degrees, in that the directions of polarization of the polarizing means and analyzing means cross each other substantially perpendicularly, said polarizing means being arranged such that the angle between the direction of polarization of the polarized light incident on the first supporting plate and the direction of orientation produced by the orientation means said first supporting plate is provided with has a value of $\frac{1}{2}\phi$.

2. A display device as claimed in claim 1, characterized in that the substrate comprises picture electrodes which can be driven via switching elements.

3. A display device as claimed in claim 1, characterized in that the substrate is a semiconductor substrate.

4. A projection display device, characterized in that it comprises at least one light source whose light is incident on a display device as claimed in claim 1 and is reflected dependent on the optical state of pixels defined by the picture electrodes, the light thus modulated being imaged via projection means.

5. The projection device of claim 1 wherein $0.58\ \lambda_0 < d.\Delta n < 0.68\ \lambda_0$, wherein d=the thickness of the layer of liquid crystalline material, $\Delta n$=the difference in the refractive index of the ordinary wave and the refractive index of the extraordinary wave and $\lambda_0$=the central wavelength of light from the light source.

6. A projection device capable of being in a light transmissive or a light extinguished state and exhibiting a maximum transmission of light when in the extinguished stage of about 1% of the light transmission when in the transmissive state when the central wavelength of light from a light source employed in said projection device is 460–620 nm comprising said light source, a reflective display device of the twisted nematic type comprising a layer of liquid crystalline material between a first and a second supporting plate, said supporting plates being provided with orientation means which define a twist angle $\phi$ for the molecules of the liquid crystalline material, means being provided for directing light from the light source onto the first supporting plate, the second supporting plate being provided with means for reflecting light which passes through the layer of liquid crystalline material, which projection device further comprises polarizing means in the light path between the light source and the first supporting plate and analyzing means in the light path after reflection at the display device characterized in that the twist angle $\phi$ has a value between 50 and 68 degrees, in that the directions of polarization of the polarizing means and analyzing means cross each other substantially perpendicularly, said polarizing means being located along the bisectrix of the angle between the directions of orientation provided on said first and second supporting plates.

7. The projection device of claim 6 wherein $0.58\ \lambda_0 < d.\Delta n < 0.68\ \lambda_0$, wherein d=the thickness of the layer of liquid crystalline material, $\Delta n$=the difference in the refractive index of the ordinary wave and the refractive index of the extraordinary wave and $\lambda_0$=the central wavelength of light from the light source.

* * * * *